May 10, 1960  P. BAUDELOT ET AL  2,936,196
ENDLESS TRACK FOR CROSS COUNTRY VEHICLE
Filed Aug. 14, 1957  2 Sheets-Sheet 1

INVENTORS
PIERRE BAUDELOT
VICTOR BOUFFORT
MARCEL LALA
BY Irwin S. Thompson
ATTY.

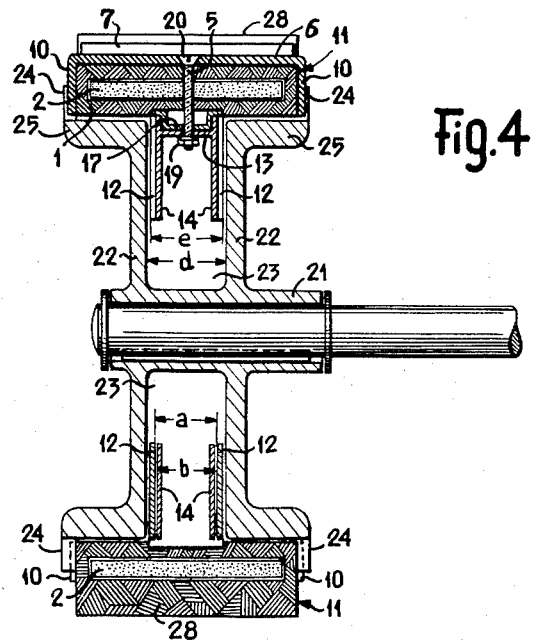
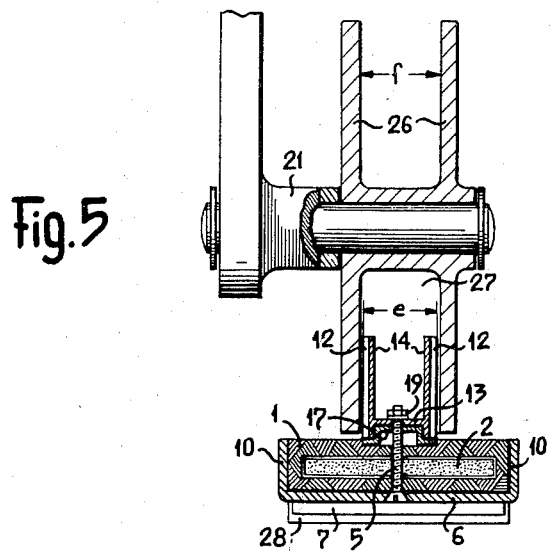

United States Patent Office 2,936,196
Patented May 10, 1960

2,936,196
ENDLESS TRACK FOR CROSS COUNTRY VEHICLE

Pierre Baudelot, Paris, Victor Bouffort, Bondy, and Marcel Lala, Paris, France, assignors to Mecatec S.A., Tangier, a limited-liability stock company of Tangier Application August 14, 1957, Serial No. 678,113

Claims priority, application Switzerland September 8, 1956

5 Claims. (Cl. 305—35)

There is actually a great number of endless tracks of different types for cross country vehicles. Recently there have been realized endless tracks for light vehicles but there have arisen great difficulties due to very great lateral forces exercised on the endless tracks when the vehicle is driven at a high speed (for instance 100 km./h.) on a turn. These forces cause the derailment of the endless tracks and the tests, which have been carried out, have proved that neither the rubber reinforced endless tracks, nor the endless tracks with metallic elements hinged by the ones onto the others, could give any satisfaction for vehicles reaching speeds higher than 100 km./h.

The present invention has for its object an endless track for a cross country vehicle which is characterized by the fact that it comprises an endless band, made out of a flexible and elastic reinforced material, the external face of which presents parallel transverse grooves and forming between them elastic teeth, driving members being located in said grooves, said driving members bearing on the faces of said elastic teeth, and by the fact that they comprise guiding members fastened on the internal face of the endless band by connecting members which connect each of said guiding members individually to one of said driving members through the said band, whereby said guiding members are elastically articulated with respect to each other through the intermediary of the said endless band, but oppose deformations of the said endless band caused by the action of lateral forces, and by the fact that the driving members are elastically movable with respect to each other and with respect to the internal reinforcement of the endless band.

The attached drawing shows schematically and by way of example a light vehicle comprising endless tracks according to the invention, as well as a form of construction of said endless track.

Fig. 4 is a cross section of one wheel at a greater scale along line IV—IV of Fig. 1.

Fig. 5 is a cross section at a greater scale along line V—V of Fig. 1.

Figure 1:
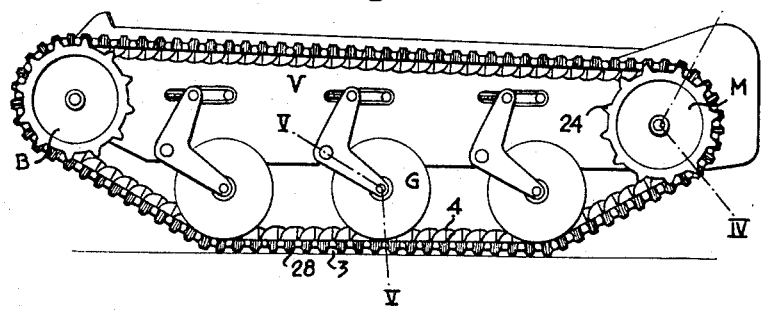
Fig. 1 is a side view of a light vehicle.
Figure 2:
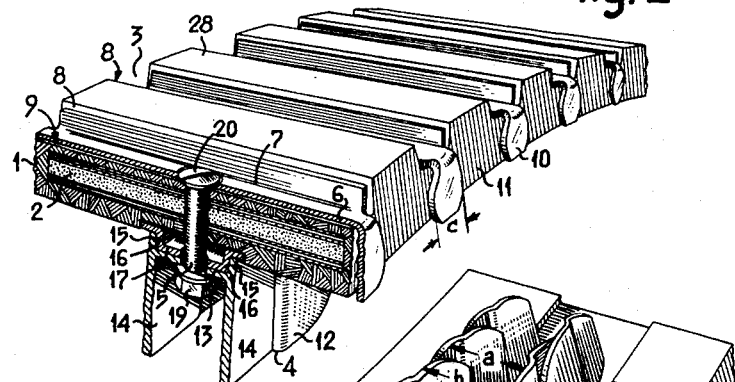
Fig. 2 is a perspective view of a section of the endless track.
Figure 3:
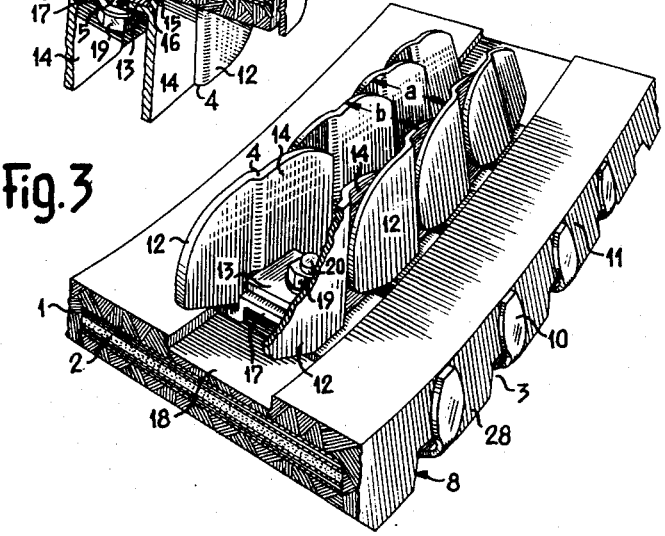
Fig. 3 is a perspective view of the internal part of an endless track section.

According to the attached drawing, the endless track is constituted, on the one hand, by an endless band 1 of a flexible and elastic material, comprising an internal reinforcement 2 and parallel transverse grooves 3, set in the external face of said band and forming between them rubber teeth 28 and, on the other hand, by guiding member 4, fastened on the internal face of the band 1 and connected each individually by connecting devices 5, crossing the endless band 1, to a driving member 6, located in a groove 3. Each driving member 6 comprises, on the one hand, a part 7 presenting in cross section the general shape of a U and which bears on the lateral walls 8 and the bottom 9 of a groove 3, and on the other hand, two beaks 10, bent at right angle and applied on the lateral faces 11 of the endless band. As represented on the drawing, the beaks 10 of the different driving members form two lateral driving toothings. The greater width $c$ of these beaks is located approximately in the plane of the neutral fibre of the band 1. Each guiding member 4 comprises two guiding wings 12 rigidly connected between them by a part 13, and provided each with a guiding lengthening 14. The spacing $a$ between the internal faces of the guiding wings 12 is at least equal to the spacing $b$ between the external faces of the guiding lengthenings 14. Each guiding member presents furthermore two centering members 15, which co-operate with the lateral walls 16 of a centering member 17, located in a longitudinal groove 18 made in the internal face of the endless band.

Each guiding member 4 is connected to a driving member 6 by the connecting device 5 constituted by a nut 19, engaged on a bolt 20 crossing the driving member 6, the endless band 1, the centering member 17 and the part 13 of the guiding member 4. These guiding members 4 are placed one behind each other along the internal face of the band 1 and the lengthenings 14 of a guiding member 4 are set between the wings 12 of the following guiding member 4.

These lengthenings 14 co-operating with the wings 12 form a continuous chain which opposes, in a very effectual manner, the band deformations due to forces acting laterally or cross-wise on the band 1. These guiding members keep thus the endless track over its whole length in a perpendicular plane to the grooves 3. However, owing to the elasticity of the band 1, said members are articulated with respect to each other, and the extremities of the wings 12 have the shape of an arc of circle in order to allow the angular displacements of the guiding members with respect to each other so that the endless track may, on the one hand, roll itself on the driving wheel M and on the tension sprocket-wheel B of the vehicle V and, on the other hand, follow the inequalities of the surface of the ground.

As represented in Fig. 4, the driving wheel and the sprocket-wheel comprise each a hub 21 which carries two parallel cheeks 22, the spacing $d$ of which is slightly greater than the distance $e$ between the external faces of guide wings 12 in order to constitute a guiding groove 23 for the guiding members 4. Each cheek 22 carries a rim 25 comprising, at its extremity, a radial toothing 24, which meshes with one of the two lateral toothings of the band 1, formed by the beaks 10. The endless track is thus driven simultaneously by its two lateral faces through the intermediary of the toothings 24 which mesh with the beaks 10, joined with the driving members, placed in each groove 3. Consequently, no sliding from one of the sides of the band 1 with respect to the other can happen, and the grooves 3 move always parallelly to themselves.

However, inasmuch as the band 1 is made of an elastic material such as rubber vulcanized on the reinforcement 2, each driving member 6 is elastically displaceable with respect to its two neighbouring guiding members, owning to the elasticity of the teeth 28, so as to allow a very flexible driving of the endless track, to reduce, in a very large measure, the wear of the toothings 24 and of the beaks 19, and shelter effectivey the fabric reinforcement 2 against the rough efforts that could happen at the time of the meshing of a tooth 24 with a beak 10.

As represented on the drawing, the vehicle V comprises carrying rollers G, each of them comprises (Fig. 5) a hub 21, carrying two side plates 26 the spacing $f$ of which is equal to the spacing $e$ of the cheeks 22 of the driving wheel and of the tension sprocket-wheel. Said cheeks 26 form between them a guiding groove 27 for the guiding members 4. In this manner, the endless track is well guided over the whole part of its length which may be submitted to lateral efforts at the turns, for example, and the elasticity of the band 1 tends always to keep the guiding members in the same perpendicular plane to the grooves 3, whereas the guiding members by fitting one within each other oppose, in a positive manner, the deformations of the band 1 under the action of lateral forces.

The beaks 10 constitute also an effectual protection against the wear of the lateral faces of the band 1 and the connection between the driving members 6 and the guiding members 4 being not a rigid one, light elastical displacement may happen between said members, which contributes also to the obtention of a smooth driving and assures maximum security.

In a variant form of construction, the driving wheel M may comprise a central toothed wheel, placed in the median plane of the groove 23 and meshing with the centering members 17. Also in this case, the driving of the endless track is performed through the intermediary of the driving members 6, which bears on the walls 8 of the teeth 28 of the endless track section. Therefore, the teeth 28 being elastic, it follows that each of the teeth constitutes an elastic bearing which dampens the rough efforts occurring when there is a sudden shock or at the time of the engagement of each successive tooth of the driving wheel, and shelters thus the non-stretching internal fabric reinforcement 2 of the band 1.

Tests which have been carried out, have proved besides that the wear of the teeth 28 of the non-skidding section of the endless track is reduced to a very great measure (from 8 to 10 times) by the presence of the U-shaped driving members 6, which bear against faces 8 of groove 3. This peculiarity presents a great advantage, because the life time of an endless track is generally determined by the time in which its non-skidding section is worn out, that is to say the kilometer number which could run the endless track before its section is worn out. Thus, an increase of the time necessary for wearing the non-skidding section of the endless track results in an extension of the expectation of life of the endless track, and this is particularly appreciable in the case of very fast vehicles.

We claim:

1. An endless track comprising a series of spaced parallel metal members, means on each said member for engaging the teeth of a sprocket in driving relationship, endless rubber-like means elastically connecting each said member to the members adjacent thereto, said rubber-like means having surfaces defining transverse parallel grooves in the external face thereof, said members each occupying one of said grooves, and said members each being U-shaped in cross section and having parts thereof in engagement with the surfaces which define each said groove, whereby shock forces between sprocket teeth and ground-engaging parts of said track will be absorbed by said rubber-like means.

2. An endless track for high-speed driven, light, cross-country vehicles comprising an endless longitudinally extensible band in one piece made of resilient internally fabric reinforced material having parallel longitudinally spaced U-shaped transverse grooves in the external face thereof, said grooves forming transverse teeth therebetween, transverse metal bars presenting in cross section a general shape corresponding to the shape of said grooves, each of said transverse bars being located in one of said transverse grooves and bearing on the bottom and on the side walls of said groove, inwardly projecting metal teeth integral each with one extremity of said transverse bars and forming on the two lateral faces of said endless band two lateral toothings adapted for meshing engagement with the driving wheel and sprocket wheel of said vehicle, metal guiding members each fastened opposite one of said transverse bars on the internal face of said endless band and extending in longitudinal overlapping relationship to oppose the deformations of said endless band due to lateral forces, connecting means connecting each of said transverse bars with its opposite located guiding member and securing said transverse bars and guiding members to said endless band, whereby said transverse bars and guiding members are elastically mutually articulated by the intermediary of said endless band and further the mutual spacing of said transverse bars is elastically extensible for said transverse bars are connected one to another only by said elastically extensible endless band.

3. The track of claim 1, said rubber-like means comprising an endless rubber band.

4. The track of claim 1, said teeth-engaging means comprising flanges on each of said members extending towards the inner face of said rubber-like means.

5. The track of claim 1, and guide means on the interior of said track comprising a plurality of longitudinally overlapping guiding members each connected with one of said members.

References Cited in the file of this patent

UNITED STATES PATENTS

| | | |
|---|---|---|
| 1,693,833 | Worley | Dec. 4, 1928 |
| 1,820,695 | Engstrom | Aug. 25, 1931 |
| 2,037,983 | Johnston | Apr. 21, 1936 |
| 2,040,696 | Johnston | May 12, 1936 |
| 2,430,986 | Kline et al. | Nov. 18, 1947 |
| 2,761,745 | Atkinson | Sept. 4, 1956 |